US012244370B2

(12) United States Patent
You et al.

(10) Patent No.: US 12,244,370 B2
(45) Date of Patent: Mar. 4, 2025

(54) TRANSMIT METHOD BASED ON SATELLITE MASSIVE MIMO INTEGRATED SENSING AND COMMUNICATION

(71) Applicant: Southeast University, Jiangsu (CN)

(72) Inventors: Li You, Jiangsu (CN); Xiaoyu Qiang, Jiangsu (CN); Yuqi Ye, Jiangsu (CN); Yan Huang, Jiangsu (CN); Wenjin Wang, Jiangsu (CN); Xiqi Gao, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/786,380

(22) PCT Filed: Oct. 12, 2021

(86) PCT No.: PCT/CN2021/123282
§ 371 (c)(1),
(2) Date: Jun. 16, 2022

(87) PCT Pub. No.: WO2023/044982
PCT Pub. Date: Mar. 30, 2023

(65) Prior Publication Data
US 2024/0195462 A1    Jun. 13, 2024

(30) Foreign Application Priority Data
Sep. 22, 2021    (CN) .......................... 202111106179.5

(51) Int. Cl.
*H04B 7/0456* (2017.01)
*H04B 7/185* (2006.01)

(52) U.S. Cl.
CPC ....... *H04B 7/0456* (2013.01); *H04B 7/18513* (2013.01)

(58) Field of Classification Search
CPC ..... H04L 5/0053; H04L 5/0048; H04L 5/001; H04L 5/0094; H04L 5/0051;
(Continued)

(56) References Cited

U.S. PATENT DOCUMENTS 11,424,789 B1 *  8/2022  Ramasamy .......... H04B 17/318
2009/0067402 A1  3/2009  Forenza et al.
(Continued)

FOREIGN PATENT DOCUMENTS

CA    3025857 A1    2/2009
CN    112511201 A    3/2021
(Continued)

OTHER PUBLICATIONS

Lu An-An et al., "Prospects and Overview of Massive MIMO Transmission," Bull. Natl. Nat. Sci. Found, China, vol. 34, Issue 2, 2020, pp. 186-192.

*Primary Examiner* — Eva Y Puente
(74) *Attorney, Agent, or Firm* — Muncy, Geissler, Olds & Lowe, P.C.

(57) ABSTRACT

Disclosed is a transmit method based on satellite massive Multiple-Input Multiple-Output (MIMO) integrated sensing and communication, where a satellite end is equipped with a massive MIMO array to implement an integrated sensing and communication system. The satellite end sends a communication signal to multiple user terminals based on statistical properties of electromagnetic wave propagation, and detects multiple targets simultaneously, thus realizing simultaneous communication of the satellite end with the user terminals and sensing for the targets. The present disclosure fully utilizes the spectrum resources, implements a flexible switch between wireless communication and target sensing functions based on a satellite, and mitigates the effects of the beam squint on system performance, thus greatly improving communication performance and radar resolution and being (Continued)

applicable for construction of an integrated network of space, air, ground and sea to achieve global coverage.

3 Claims, 1 Drawing Sheet

(58) Field of Classification Search
CPC ... H04L 5/0055; H04L 5/0023; H04L 5/0091; H04B 7/0617; H04B 7/0639; H04B 7/086; H04B 7/0413; H04B 17/12; H04B 7/0408; H04B 7/0695; H04B 17/23; G06F 18/24; G06F 18/253; G06F 17/00; G06F 2119/14; G06F 2203/04104; G06F 3/043; G06F 3/0433; G06F 30/27
USPC .......................................................... 375/267
See application file for complete search history.

(56) References Cited

U.S. PATENT DOCUMENTS

2014/0219375 A1* 8/2014 Zhu ...................... H04B 7/0626
375/267
2020/0334425 A1* 10/2020 Gangopadhyay .. G06K 7/10158

FOREIGN PATENT DOCUMENTS

| CN | 113746534 A | 12/2021 | | |
|---|---|---|---|---|
| WO | WO2021062354 | 4/2021 | | |
| WO | WO-2022187694 A1 * | 9/2022 | ......... | A61B 5/02007 |

* cited by examiner

TRANSMIT METHOD BASED ON SATELLITE MASSIVE MIMO INTEGRATED SENSING AND COMMUNICATION

TECHNICAL FIELD

The present disclosure relates to a transmit method based on satellite massive Multiple-Input Multiple-Output (MIMO) integrated sensing and communication.

BACKGROUND

With the rapid development of wireless industry, spectrum resources become increasingly scarce and the value thereof becomes increasingly high. In order to improve the utilization of the spectrum resources, an integrated sensing and communication method and system are proposed to achieve frequency reuse between two functional modules of wireless communication and radar sensing. In the integrated sensing and communication system, communication and sensing can be simultaneously conducted on the same hardware platform, to make decongestion of an RF environment possible. The existing integrated sensing and communication work is mainly focused on the terrestrial network, and many designs have been explored, so as to improve the performance of the two functional modules.

For a satellite massive MIMO integrated sensing and communication system, its electromagnetic wave propagation characteristics are significantly different from those in the terrestrial network, and therefore, a terrestrial integrated sensing and communication system cannot be directly used. Specifically, there are mainly two aspects: First, because the distance between the satellite and the user terminal as well as the target is relatively long, a high propagation delay is caused; and further, the mobility of the user terminal and the detection target may lead to a large Doppler shift. In addition, considering that the wideband satellite massive MIMO integrated sensing and communication system employs a large number of antennas and wideband transmission, the channel dimension is large and changes rapidly, which poses a challenge to the estimation of status information of electromagnetic wave propagation. In general cases, for the satellite massive MIMO integrated sensing and communication system, at the satellite-side transmitter end, it is difficult to obtain accurate instantaneous status information of electromagnetic wave propagation.

SUMMARY

Invention Objective

For the foregoing prior art, a satellite massive MIMO integrated sensing and communication method and system based on statistical status information of electromagnetic wave propagation and taking beam squint into consideration are proposed, which can effectively mitigate the effects of the beam squint on system performance, realize efficient utilization of spectrum resources, and implement a flexible switch between wireless communication and target sensing, thus greatly improving energy efficiency of communication and radar resolution.

Technical Solution

A transmit method based on satellite massive MIMO integrated sensing and communication is provided, where a satellite end is equipped with a massive MIMO antenna array which simultaneously serves multiple users and detects multiple targets. Communication and sensing use the same spectrum resources and the same hardware platform, and integrated sensing and communication is implemented by transmitting a signal to focus on communication or sensing. The satellite end estimates statistical status information of electromagnetic wave propagation according to received uplink and downlink pilot signals, where for a communication process, the statistical status information of electromagnetic wave propagation is a channel gain and a channel direction vector between the satellite end and user terminals; and for a sensing process, the statistical status information of electromagnetic wave propagation is angles of departure of the targets. According to the statistical status information of electromagnetic wave propagation, the satellite end transmits a directional beam to a detection target and a downlink signal to each user terminal by means of integrated sensing and communication precoding. During the dynamic movement of the satellite and the user terminals as well as the targets, with the change in the statistical status information of electromagnetic wave propagation between the satellite and the user terminals as well as the targets, the integrated sensing and communication precoding is updated.

Advantageous Effects

A satellite massive MIMO integrated sensing and communication method of the present disclosure has the following advantages:
(1) In the present disclosure, statistical properties of electromagnetic wave propagation that considers beam squint are modelled, thus establishing a relationship between the degree of beam squint and system-related parameters.
(2) In the present disclosure, the transmitter of the system can execute communication and sensing functions simultaneously, and adjust the weight of the two functional modules by introducing a weighting coefficient, so as to weigh communication energy efficiency and estimation accuracy of a radar beam mode.
(3) In the present disclosure, a hybrid precoding method is designed, so as to mitigate the effects of the beam squint, thus enhancing the energy efficiency and performance of communication and the resolution of radar sensing.

DETAILED DESCRIPTION OF THE EMBODIMENTS

The present disclosure is further explained below with reference to the accompanying drawings.

Figure 1:
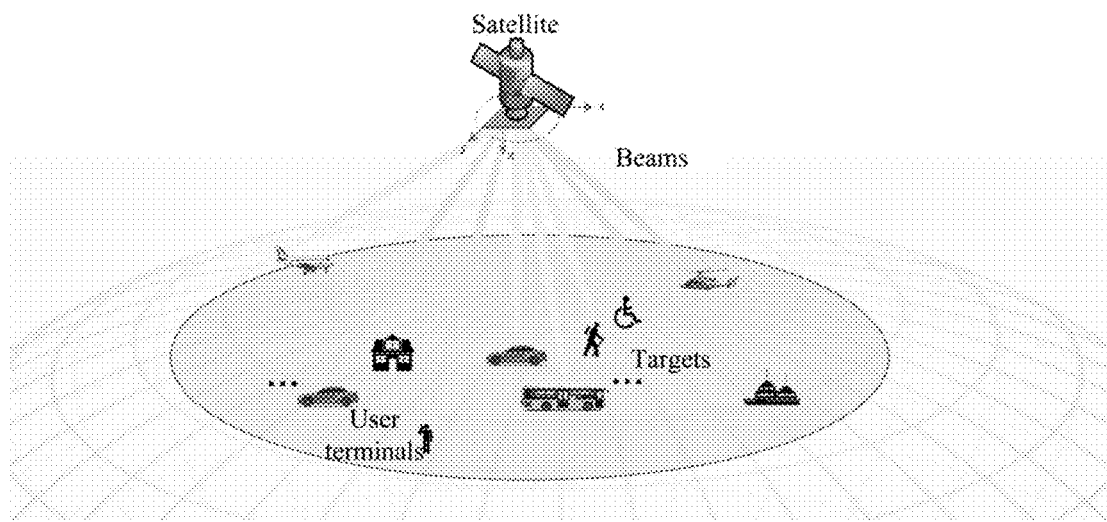
FIG. 1 is a schematic diagram of a satellite massive MIMO integrated sensing and communication system.

In a satellite massive MIMO integrated sensing and communication method, a satellite end is equipped with a massive MIMO antenna array which simultaneously serves multiple users and detects multiple targets, as shown in FIG. 1. Communication and sensing use the same spectrum resources and the same hardware platform, and integrated sensing and communication is implemented by transmitting a signal to focus on communication or sensing, where a communication process includes channel estimation and data transmission, and a sensing process includes target search by radar and beam forming. The satellite end estimates statistical status information of electromagnetic wave propagation according to received uplink and downlink pilot signals, where for the communication process, the statistical status information of electromagnetic wave propagation is a channel gain and a channel direction vector between the satellite end and user terminals; and for the sensing process, the statistical status information of electromagnetic wave propagation is angles of departure of the targets.

According to the statistical status information of electromagnetic wave propagation, the satellite end transmits a directional beam to a detection target and a downlink signal to each user terminal by means of integrated sensing and communication precoding, where the integrated sensing and communication precoding is a hybrid precoding scheme based on an energy efficiency maximization principle and a convex optimization algorithm. Each antenna unit of the massive MIMO antenna array sends signals independently by using a fully digital or analog or hybrid transmission manner. In the process of simultaneously implementing communication and sensing, the performance of communication and sensing is weighed by introduction of a weighting coefficient, so as to realize a flexible switch between wireless communication and target sensing functions. During the dynamic movement of the satellite and the user terminals as well as the targets, with the change in the statistical status information of electromagnetic wave propagation between the satellite and the user terminals as well as the targets, the integrated sensing and communication precoding is updated.

Figure 2:
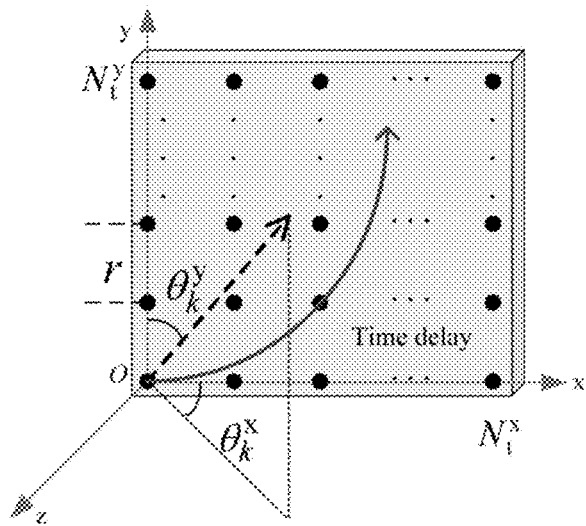
FIG. 2 is a schematic diagram of configuration of a massive antenna array at a satellite end.

Specifically, as shown in FIG. 2, the satellite end is equipped with a massive MIMO antenna array which includes more than hundreds of antenna units, where each antenna unit may be a unipolar or multipolar antenna. The array structure is a uniform surface array, where the numbers of antennas in the x and y directions are $N_t^x$ and $N_t^y$ respectively, and then a total number of the antennas is $N_t = N_t^x \times N_t^y$; and a spacing between the antennas is r. Further, a hybrid analog/digital transmitter is used to serve K single antenna users, and each user terminal uses a fully digital receiver. Multiple targets are detected simultaneously, and the number of RF chains required by the transmitter is $M_t$, where $K \leq M_t \leq N_t$.

Considering frequency selectivity of a wideband massive MIMO low earth orbit satellite system, inter-symbol interference is reduced by means of Orthogonal Frequency Division Multiplexing (OFDM). That is, M sub-carriers are used in total for a signal bandwidth $B_w$, and then the spacing between the sub-carriers is $\Delta_b = B_w/M$. Thus, the frequency of the mth sub-carrier is:

$$f_m = \left(m - \frac{M+1}{2}\right)\Delta_B, m = 1, 2, \ldots, M. \quad (1)$$

1. Communication Module
(1) Modeling of Statistical Properties of Multipath Channel Propagation that Considers Beam Squint It is noted that the satellite altitude is much higher than the scatterers around the terrestrial user terminals. If there are in total $L_k$ propagation paths for the kth user, the propagation paths are set to have the same angle $\vartheta_k = (\vartheta_k^x, \vartheta_k^y)$ of departure, where $\vartheta_k^x$ and $\vartheta_k^y$ denote angles of departure in the x and y directions respectively. If a propagation delay on the lth path is $\tau_{k,l}$, a total delay $\tau_{k,l,n_x,n_y}$ to the $(n_x, n_y)$th element in the antenna array is:

$$\tau_{k,l,n_x,n_y} = \tau_{k,l} + \tau_{n_x,n_y}(\vartheta_k), \quad (2)$$

The second term in the equation refers to a time delay from the (1,1)th element to the $(n_x, n_y)$th element in the antenna array for the kth user, namely:

$$\tau_{n_x,n_y}(\vartheta_k) \triangleq \frac{r((n_x-1)\vartheta_k^x + (n_y-1)\vartheta_k^y)}{c}, \quad (3)$$

where $n_x \in \{1,2,\ldots,N_t^x\}$ and $n_y \in \{1,2,\ldots,N_t^y\}$ denote antenna unit numbers in the x and y directions respectively, and c denotes the velocity of light.

Assuming that a channel gain of the lth path for the kth user is $a_{k,l}$ and the Doppler gain is $v_{k,l}$, a downlink channel space-frequency response $h_{k,n_x,n_y}(t, f)$ between the kth user and the $(n_x, n_y)$th element of the low earth orbit satellite-end antenna array at the time t and the frequency f is:

$$h_{k,n_x,n_y}(t, f) = \sum_{l=1}^{L_k} \alpha_{k,l}\exp\{j2\pi[tv_{k,l} - f\tau_{k,l}]\}\exp\{-j2\pi(f_c+f)\gamma_{n_x,n_y}(\vartheta_k)\}, \quad (4)$$

where $\exp\{\square\}$ denotes an exponential operator, $\emptyset = \sqrt{-1}$, and $f_c$ denotes the carrier frequency. The above equation is rearranged and vectorized to obtain the following baseband downlink channel space-frequency response vector after time-frequency synchronization:

$$h_k(t,f) = v_k(f)g_k(t,f), \quad (5)$$

where the channel gain $g_k(t,f)$ follows the Rician distribution with a parameter being the Rician parameter $\kappa_k$ and its energy meets $E\{|g_k(t, f)|^2\} = \gamma_k$, $\gamma_k$ being the channel energy between the satellite and the kth user and $E\{\square\}$ denoting an operator for evaluation of expectation; and $v_k(f)$ is an array response vector and meets the following formula:

$$v_k(f) \square v(f,\vartheta_k) = v_k^x(f) \otimes v_k^y(f) = v_x(f, \vartheta_k^x) \otimes v_y(f, \vartheta_k^y)$$
$$\in \square^{N_t \times 1}, \quad (6)$$

where $\square^{m \times n}$ denotes a subspace with dimensions of m×n, and $\otimes$ denotes the Kronecker product; and in the case of $d \in D\square\{x, y\}$, there is the following formula:

$$v_k^d(f) \triangleq \frac{1}{\sqrt{N_t^d}}\left[1\exp\{-j\phi(f, \vartheta_k^d)\} \ldots \exp\{-j\phi(f, \vartheta_k^d)(N_t^d - 1)\}\right]^T, \quad (7)$$

where $$\phi(f, \vartheta_k^d) \triangleq 2\pi(f_c + f)\frac{r}{c}\vartheta_k^d$$

and the superscript T denotes a transpose operator; and v (f, $\vartheta_k$) denotes an array response associated with the frequency and the angle of departure.

For ease of description, considering each coherent time interval, a time parameter t is omitted. In addition, at the mth sub-carrier with the frequency of $f_m$, let $h_k[m] \square h_k(f_m)$, $v_k[m] \square v_k(f_m)$, and $g_k[m] \square g_k(f_m)$. Thus, a corresponding channel response vector may be expressed as follows:

$$h_k[m] = v_k[m]g_k[m]. \quad (8)$$

(2) Consideration of Downlink Channel Transmission Signals

At the mth sub-carrier, a data vector is $s[m]=[s_1[m], s_2[m], \ldots, s_K[m]]^T \in \square^{K \times 1}$, where $s_k[m]$ is a transmission symbol for the kth user. Then, a signal transmission vector is $x[m]=B[m]s[m] \in \square^{N_t \times 1}$, where $B[m]$ is a hybrid precoding matrix including constant-modulus RF precoders $V[m] \in \square^{N_t \times M'}$ and baseband precoders $W[m]=[w_1[m], w_2[m], \ldots, w_K[m]] \in \square^{M' \times K}$, where $w_k[m]$ is a baseband precoding vector for the kth user. Then, $B[m]=V[m]W[m]=[b_1[m], b_2[m], \ldots, b_K[m]] \in \square^{N_t \times K}$ is obtained, where $b_k[m]=V[m]w_k[m] \in \square^{N_t \times 1}$ is a precoding vector for the kth user.

The signal-to-interference-plus-noise ratio SINR, the rate $R_k$, and the energy efficiency EE between the satellite and the kth user are respectively defined as follows:

$$SINR_k[m] \triangleq \frac{|b_k^H[m]h_k[m]|^2}{\sum_{\ell \neq k}|b_\ell^H[m]h_k[m]|^2 + N_0}, \quad (9)$$

$$R_k = \sum_{m=1}^{M} \Delta_B R_k[m] = \sum_{m=1}^{M} \Delta_B \mathbb{E}\{\log(1 + SINR_k[m])\}, \quad (10)$$

$$EE = \frac{\sum_{k=1}^{K} R_k}{P^{total}}. \quad (11)$$

where $$P^{total} = \sum_{k=1}^{K} \sum_{m=1}^{M} \xi \|b_i[m]\|_2^2 + P_t$$

is a total transmit power, $$1/\xi$$

being the effectiveness of an amplifier, $P_t$ being the static power consumption, and $\|\square\|_2$ denoting the norm of vector 2; $N_0$ denotes the noise power; $b_l[m]$ denotes a precoding vector for the lth user; the superscript H is a matrix operator; $SINR_k[m]$ denotes the signal-to-interference-plus-noise ratio of the kth user at the mth sub-carrier; and $R_k[m]$ denotes the rate of the kth user at the mth sub-carrier.

2. Sensing Module

A subarray MIMO radar designed in conjunction with a hybrid precoding architecture is considered, and at the mth sub-carrier, the mode of an omnidirectional beam sent by the radar is:

$$Q_m(\vartheta) = v_m^H(\vartheta)X[m]v_m(\vartheta), \forall \vartheta, \quad (12)$$

where $v_m^H(\vartheta) \square v(f_m, \vartheta)$ denotes an array response vector with the angle of departure of $\vartheta$, $v(f_m, \vartheta)$ denotes an array response associated with the frequency and the angle of departure, $\vartheta = (\vartheta^x, \vartheta^y)$ denotes the angle of departure, $\vartheta^x$ and $\vartheta^y$ denote the angles of departure in the x and y directions respectively, and the autocorrelation matrix $X[m]$ is defined as follows:

$$X[m] = \mathbb{E}\{x[m]x^H[m]\} = V[m]W[m]W^H[m]V^H[m]. \quad (13)$$

Assuming that there are $P_r \leq K$ detection targets, an optimal subarray radar precoder may be expressed as follows:

$$B_{rad}[m] = \text{blkdiag}\{u_1[m], u_2[m], \ldots, u_{P_r}[m]\} \in \square^{N_t \times P_r}, \quad (14)$$

where $u_p[m] \in \square^{N_t/P_r \times 1}$ denotes elements at corresponding positions in $v_p[m]$, $\text{blkdiag}\{\square\}$ denotes a block diagonal array, $p \in \{1, 2, \ldots, P_r\}$, $v_p[m]$ denotes an array response associated with the frequency and the angle of departure, and $P_r$ denotes the number of the targets.

3. Design of a Hybrid Precoder Sensing Beam Squint

A hybrid precoder sensing beam squint is designed for the wideband downlink satellite massive MIMO integrated sensing and communication system, so as to ensure the radar sensing performance while seeking maximum energy efficiency of communication, where the following optimization problem $P_1$ is considered:

$$\mathcal{P}_1: \underset{\{V[m], W[m], U[m]\}_{m=1}^{M}}{\text{maximize}} \frac{\sum_{k=1}^{K} R_k}{P^{total}} \quad (15)$$

$$\text{s.t. } \sum_{k=1}^{K}\sum_{m=1}^{M} \|V[m]w_k[m]\|_2^2 \leq P,$$

$$V[m] \in \mathcal{S}, \forall m,$$

$$\|V[m]W[m] - B_{rad}[m]U[m]\|_F^2 \leq \varepsilon, \forall m,$$

$$U[m]U^H[m] = I_{P_r}, \forall m,$$

In the foregoing formula, P denotes the power budget; $U[m]$ is an auxiliary unitary matrix introduced at the mth sub-carrier, which enables the optimal radar precoder and the hybrid precoder to match in dimensions, and this operation does not affect the beam mode of the radar; $\varepsilon$ is an Euclidean distance tolerance term between the digital/analog hybrid precoder and the radar precoder (capable of rotation); $I_{P_r}$ is a unit matrix of the order $P_r \times P_r$; and $\|\square\|_F$ denotes the Frobenius-norm of a matrix. In addition, $\mathcal{S} \square \{\mathcal{S}_{FC}, \mathcal{S}_{PC}\}$ denotes the constraints the analog precoders need to satisfy, where specifically speaking, $\mathcal{S}_{FC}$, $\mathcal{S}_{PC}$ respectively denote the constraints which the analog precoders having fully connected and partially connected structures need to satisfy, that is:

$$\mathcal{S}_{PC} \triangleq \{V \mid |[V]_{i,j}| = 1, \forall i, j\}, \quad (16)$$

$$\mathcal{S}_{PC} \triangleq \left\{V \mid |[V]_{i,j}| = 1, \forall i, \forall j = \left\lceil \frac{i}{N_g} \right\rceil \right\}, \quad (17)$$

where $N_g = N_t/M_t$ denotes the number of groups.

Step 1: For the optimization problem $P_1$, the product of the analog and digital precoders is regarded as a whole and irrelevant constraints are disregarded for the moment, to obtain a fully digital precoding problem $P_2$:

$$\mathcal{P}_2: \underset{\{B[m]\}_{m=1}^{M}}{\text{maximize}} \frac{\sum_{k=1}^{K} R_k}{P^{total}} \quad (18)$$

$$\text{s.t. } \sum_{k=1}^{K}\sum_{m=1}^{M} \|b_k[m]\|_2^2 \leq P.$$

Step 2: Because it is difficult to estimate an accurate value of $R_k[m]$, considering statistical properties of wave propagation, its tight bound is used as a replacement, namely:

$$R_k[m] \le \overline{R}_k[m] \triangleq \log\left(1 + \frac{\gamma_k |v_k^H[m] b_k[m]|^2}{\sum_{\ell \ne k} \gamma_k |v_k^H[m] b_\ell[m]|^2 + N_0}\right) \quad (19)$$

Step 3: Let $B^{(i)} = \{B^{(i)}[m]\}_{m=1}^M$ be a precoding matrix set of all the sub-carriers, and the problem $P_2$ is transformed into a series of sub-problems $P_3^{(i)}$, $i=1,2,\ldots$ by means of the Dinkelbach algorithm, where $i=1, 2, \ldots$:

$$P_3^{(i)}: \max_{\mathcal{B}^{(i)}} F(\mathcal{B}^{(i)}, \eta^{(i)}) = \sum_{k=1}^K \overline{R}_k(\mathcal{B}^{(i)}) - \eta^{(i)} P^{total}(\mathcal{B}^{(i)}) \quad (20)$$

$$\text{s.t.} \sum_{k=1}^K \sum_{m=1}^M \|b_k^{(i)}[m]\|_2^2 \le P.$$

where the auxiliary variable $\eta^{(i)}$ meets the following equation:

$$\eta^{(i)} = \frac{\sum_{k=1}^K \overline{R}_k(\mathcal{B}^{(i-1)})}{P^{total}(\mathcal{B}^{(i-1)})}. \quad (21)$$

Step 4: The ith sub-problem is taken into consideration, and the serial number i is omitted for convenience. Let $b_k[m] = b_{k,m}$ and $v_k[m] = v_{k,m}$, and then the problem $P_3^{(i)}$ may be expressed as follows:

$$P_3: \max_{\mathcal{B}} F(\mathcal{B}) = \quad (22)$$

$$\sum_{k=1}^K \sum_{m=1}^M \log\left(1 + \frac{\gamma_k |v_{k,m}^H b_{k,m}|^2}{\sum_{\ell \ne k} \gamma_k |v_{k,m}^H b_{k,m}|^2 + N_0}\right) - \eta(\xi \|b_{k,m}\|_2^2 + P_1)$$

$$\text{s.t.} \sum_{k=1}^K \sum_{m=1}^M \|b_{k,m}\|_2^2 \le P.$$

Step 5: By introducing the auxiliary variable $\lambda = \{\lambda_{k,m}\}_{k=1,m=1}^{K,M}$ and by means of Lagrangian dual transformation, the foregoing problem is transformed into $P_4$:

$$P_4: \max_{\mathcal{B},\lambda} F(\mathcal{B}, \lambda) = \sum_{k=1}^K \sum_{m=1}^M \log(1 + \lambda_{k,m}) + \quad (23)$$

$$(1 + \lambda_{k,m}) \frac{\gamma_k |v_{k,m}^H b_{k,m}|^2}{\sum_{\ell=1}^K \gamma_k |v_{k,m}^H b_{\ell,m}|^2 + N_0} - \lambda_{k,m} - \eta(\xi \|b_{k,m}\|_2^2 + P_1)$$

$$\text{s.t.} \sum_{k=1}^K \sum_{m=1}^M \|b_{k,m}\|_2^2 \le P.$$

It should be noted that, when B is fixed, $F(B, \lambda)$ is a concave function for the variable $\lambda_{k,m}$; and let $\partial F/\partial \lambda_{k,m} = 0$, to obtain:

$$\lambda_{k,m}^{opt} = \frac{\gamma_k |v_{k,m}^H b_{k,m}|^2}{\sum_{\ell \ne k} \gamma_k |v_{k,m}^H b_{\ell,m}|^2 + N_0}. \quad (24)$$

Step 6: By introducing the auxiliary variable $\rho = \{\rho_{k,m}\}_{k=1,m=1}^{K,M}$ and by means of quadratic transformation, the problem $P_4$ is transformed into:

$$P_5: \max_{B,\lambda,\rho} F(B, \lambda, \rho) \quad (25)$$

$$\text{s.t.} \sum_{k=1}^K \sum_{m=1}^M \|b_{k,m}\|_2^2 \le P.$$

where: (26)

$$F(B, \lambda, \rho) = \sum_{k=1}^K \sum_{m=1}^M \log(1 + \lambda_{k,m}) - \lambda_{k,m} + 2\sqrt{(1 + \lambda_{k,m})\gamma_k} \, \Re\{b_{k,m}^H v_{k,m} \rho_{k,m}\} -$$

$$|\rho_{k,m}|^2 \left(\sum_{\ell=1}^K \gamma_k |v_{k,m}^H b_{\ell,m}|^2 + N_0\right) - \eta(\xi \|b_{k,m}\|_2^2 + P_1).$$

Let $\partial F/\partial \rho_{k,m} = 0$, to obtain: (27)

$$\rho_{k,m}^{opt} = \frac{\sqrt{(1 + \lambda_{k,m})\gamma_k} \, v_{k,m}^H b_{k,m}}{\sum_{\ell=1}^K \gamma_k |v_{k,m}^H b_{\ell,m}|^2 + N_0}.$$

Step 7: It is noted that when $(\eta, \lambda, \rho)$ is fixed, the target function of the problem $P_5$ is convex for the variable $b_{k,m}$; and then the Lagrangian operator method may be used for evaluation. Specifically, the Lagrange multiplier t is introduced, and then the Lagrange function of the problem $P_5$ may be expressed as follows:

$$L(B, \lambda, \rho, t) = F(B, \lambda, \rho) + t\left(\sum_{k=1}^K \sum_{m=1}^M \|b_{k,m}\|_2^2 - P\right). \quad (28)$$

From KKT conditions, the following formulas can be obtained:

$$b_{k,m}^{opt} = \left(\sum_{\ell=1}^K |\rho_{\ell,m}|^2 \gamma_\ell v_{\ell,m} v_{\ell,m}^H + (\eta\xi + t)I\right)^{-1} \sqrt{(1 + \lambda_{k,m})\gamma_k} \, \rho_{k,m} v_{k,m}, \quad (29)$$

$$t = \arg\min_{t \ge 0} \sum_{k=1}^K \sum_{m=1}^M \|b_{k,m}^{opt}\|_2^2 \le P. \quad (30)$$

Step 8: For the mth sub-carrier, after an equivalent fully digital pre-coding matrix $B_{com}[m]$ is obtained, a weighting coefficient $\zeta$ is introduced to weigh the performance of communication and sensing modules, where a corresponding minimization problem for a weighted sum is:

$$Q_1^m: \underset{V[m],W[m],U[m]}{\text{minimize}} f(V[m], W[m], U[m]) = \tag{31}$$

$$\zeta\|V[m]W[m] - B_{com}[m]\|_F^2 + (1-\zeta)\|V[m]W[m] - B_{rad}[m]U[m]\|_F^2$$

$$\text{s.t. } V[m] \in S, \forall m,$$

$$\|B_{com}[m]\|_F^2 = \|V[m]W[m]\|_F^2,$$

$$U[m]U^H[m] = I_{P_r}, \forall m,$$

where $\zeta$ denotes the weight. For any sub-carrier m, analog and digital precoding vectors can be obtained by means of iterative solution, and the mark number m is omitted in the following description.

Step 9: For the analog precoders having the fully connected structure: (4) for the fixed V and W, the problem $Q_1$ is transformed into:

$$Q_2: \underset{U}{\text{minimize}} \|VW - B_{rad}U\|_F^2 \tag{32}$$

$$\text{s.t. } UU^H = I_{P_r},$$

A solution to the foregoing problem can be obtained by means of singular value decomposition, namely:

$$U = QI_{P_r \times K}R, \tag{33}$$

where Q and R are results after singular value decomposition is performed for $B_{rad}^H VW$, that is, $Q\Sigma R = B_{rad}^H VW$, Q and R being unitary matrixes and $\Sigma$ being a diagonal matrix; and $I_{P_r \times K} = [I_{P_r}, 0]$ is a sparse matrix.

(5) For the fixed V and U, the problem $Q_1$ is transformed into:

$$Q_3: \underset{W}{\text{minimize}} \zeta\|VW - B_{com}\|_F^2 + (1-\zeta)\|VW - B_{rad}U\|_F^2 \tag{34}$$

$$\text{s.t. } \|B_{com}\|_F^2 = \|VW\|_F^2,$$

It is noted that, for the problem $Q_3$, its target function is expressed as a weighted sum of two F norms. Let the auxiliary matrixes $A=[\sqrt{\zeta}V^T, \sqrt{1-\zeta}V^T]^T \in \square^{2N^t \times M^t}$ and $C=[\sqrt{\zeta}B_{com}^T, \sqrt{1-\zeta}U^T B_{rad}^T]^T \in \square^{2N^t \times K}$, $A^H A = V^H V$ can be easily deduced. Thus, the problem $Q_3$ can be transformed into:

$$Q_4: \underset{W}{\text{minimize}} \|AW - C\|_F^2 \tag{35}$$

$$\text{s.t. } \|B_{com}\|_F^2 = \|AW\|_F^2,$$

Then, the digital precoder W can be updated as follows:

$$W = (A^H A)^{-1} A^H C = (V^H V)^{-1} A^H C, \tag{36}$$

$$W = \frac{\|B_{com}\|_F}{\|VW\|_F} W. \tag{37}$$

(6) Let $G=[\sqrt{\zeta}W, \sqrt{1-\zeta}W] \in \square^{M^t \times 2K}$ and $T=[\sqrt{\zeta}B_{com}, \sqrt{1-\zeta}B_{rad}U] \in \square^{N^t \times 2K}$ be auxiliary matrixes, and for the fixed W and U, the problem $Q_1$ is transformed into:

$$Q_5: \underset{V}{\text{minimize}} \|VG - T\|_F^2 \tag{38}$$

$$\text{s.t. } V \in S_{FC},$$

Let the auxiliary matrix $Y=GG^H$, where its maximum characteristic value is $\lambda_{max}(Y)$; and then the problem $Q_5$ is transformed into:

$$V = \exp\{-\emptyset \angle Z^T\}, \tag{39}$$

where $Z = GT^H - (Y - \lambda_{max}(Y)I_{M_t})V^H$ is an auxiliary matrix, and $\angle$ denotes an operator for evaluation of an angle.

Steps (1) to (3) are repeated till the target function f converges.

Step 10: For the analog precoders having the partially connected structure, the (i,j)th element thereof is $[V]_{i,j} = \exp\{\emptyset \phi_{i,j}\}$, and $\forall i, j = \lceil i/N_g \rceil$, where $\lceil \square \rceil$ denotes an operator for evaluation of an upper bound, $\phi_{i,j}$ is an angle of the (i,j)th element in the matrix, and a corresponding analog precoding matrix meets $$\|VW\|_F^2 = N_g \|W\|_F^2 = \|B_{com}\|_F^2.$$

(4) For the fixed V and W, the problem $Q_1$ is transformed into:

$$Q_6: \underset{U}{\text{minimize}} \|VW - B_{rad}U\|_F^2 \tag{40}$$

$$\text{s.t. } UU^H = I_{P_r},$$

A solution to the foregoing problem can be obtained by means of singular value decomposition, namely:

$$U = QI_{P_r \times K}R, \tag{41}$$

where Q and R are results after singular value decomposition is performed for $B_{rad}^H VW$, that is, $Q\Sigma R = B_{rad}^H VW$, Q and R being unitary matrixes and $\Sigma$ being a diagonal matrix; and $I_{P_r \times K} = [I_{P_r}, 0]$ is a sparse matrix.

(5) Let $A=[\sqrt{\zeta}V^T, \sqrt{1-\zeta}V^T]^T \in \square^{2N^t \times M^t}$ and $C=[\sqrt{\zeta}B_{com}^T, \sqrt{1-\zeta}U^T B_{rad}^T]^T \in \square^{2N^t \times K}$ be auxiliary matrixes, and for the fixed V and U, the problem $Q_1$ may be transformed into:

$$Q_7: \underset{W}{\text{minimize}} \|A^H C - W\|_F^2 \tag{42}$$

$$\text{s.t. } \|W\|_F = \frac{\|B_{com}\|_F}{\sqrt{N_g}},$$

Then, the digital precoder W can be updated as follows:

$$W = \frac{\|B_{com}\|_F}{\sqrt{N_g}} \frac{A^H C}{\|A^H C\|_F}. \tag{43}$$

(6) Let the auxiliary matrixes $a=[\sqrt{\zeta}[B_{com}]_{i,:}, \sqrt{1-\zeta}[B_{rad}U]_{i,:}]$ and $p=[\sqrt{\zeta}[W]_{j,:}, \sqrt{1-\zeta}[W]_{j,:}]$, where $[\square]_{i,:}$ denotes the ith row of the matrix and $[\square]_{j,:}$ denotes the jth row of the matrix; and for the fixed W and U, the problem $Q_1$ is transformed into:

$$Q_8: \underset{v}{\text{minimize}} \; \|a - \exp\{\varnothing \phi_{i,j}\}p\|_2^2 \qquad (44)$$
$$\text{s.t.} \; V \in S_{PC},$$

Then, a solution to this problem may be expressed as follows:

$$[V]_{i,j} = \exp\{\varnothing \angle(ap^H)\}, \; \forall \, i, \; \forall \, j = \left[\frac{i}{N_g}\right]. \qquad (45)$$

Steps (1) to (3) are repeated till the target function f converges.

During the dynamic movement of the satellite and the user terminals as well as the targets, with the change in the statistical properties of wave propagation between the satellite and the user terminals as well as the targets, the foregoing integrated sensing and communication hybrid precoding process is dynamically implemented, to form an updated integrated sensing and communication hybrid precoding method.

The above merely describes preferred embodiments of the present disclosure. It should be noted that, several improvements and modifications may be made by those of ordinary skill in the art without departing from the principle of the present disclosure, and these improvements and modifications should also be construed as falling within the protection scope of the present disclosure.

What is claimed is:

1. A transmit method based on satellite massive Multiple-Input Multiple-Output (MIMO) integrated sensing and communication, comprising:
    providing a satellite end with a massive MIMO antenna array which simultaneously serves multiple users and detects multiple targets, wherein communication and sensing use the same spectrum resources and the same hardware platform, and integrated sensing and communication is implemented by transmitting a signal to focus on communication or sensing;
    estimating, by the satellite end, statistical status information of electromagnetic wave propagation according to received uplink and downlink pilot signals, wherein for a communication process, the statistical status information of electromagnetic wave propagation is a channel gain and a channel direction vector between the satellite end and user terminals;
    for a sensing process, configuring the statistical status information of electromagnetic wave propagation with angles of departure of the targets;
    according to the statistical status information of electromagnetic wave propagation, transmitting, by the satellite end, a directional beam to a detection target and a downlink signal to each user terminal by means of integrated sensing and communication precoding; and
    during dynamic movement of the satellite and the user terminals as well as the targets, updating the integrated sensing and communication precoding with a change in the statistical status information of electromagnetic wave propagation between the satellite and the user terminals as well as the targets.

2. The transmit method based on satellite massive MIMO integrated sensing and communication according to claim 1, wherein in the simultaneously implementing communication and sensing, performance of communication and sensing is weighed by introduction of a weighting coefficient.

3. The transmit method based on satellite massive MIMO integrated sensing and communication according to claim 2, wherein the integrated sensing and communication precoding comprises the following steps:
    to ensure the-radar sensing performance while seeking maximum energy efficiency of communication, establishing an optimization problem based on equation (1):

$$P_1: \underset{\{V[m],W[m],U[m]\}_{m=1}^M}{\text{maximize}} \; \frac{\sum_{k=1}^{K} R_k}{P^{total}} \qquad (1)$$

$$\text{s.t.} \; \sum_{k=1}^{K}\sum_{m=1}^{M} \|V[m]w_k[m]\|_2^2 \le P,$$
$$V[m] \in S, \; \forall \, m,$$
$$\|V[m]W[m] - B_{rad}[m]U[m]\|_F^2 \le \varepsilon, \; \forall \, m,$$
$$U[m]U^H[m] = I_{P_r}, \; \forall \, m,$$

wherein K denotes the number of users; $R_k$ denotes a communication rate between the satellite and a kth user; $P^{total}$ denotes a total transmission power; M denotes the number of sub-carriers; V[m] denotes a constant-modulus RF precoder; W[m] denotes a baseband precoder; $w_k[m]$ denotes a baseband precoding vector for the kth user; P denotes the power budget; S denotes constraints analog precoders need to satisfy; $B_{rad}[m]$ denotes an optimal sub-array radar precoder; U[m] denotes an auxiliary unitary matrix introduced at an mth sub-carrier; $\varepsilon$ is an Euclidean distance tolerance term between a hybrid precoder and the radar precoder; $I_{P_r}$ is a unit matrix of an order $P_r \times P_r$; $P_r$ denotes the number of targets; and $\|*\|_*$ denotes the Frobenius-norm of a matrix F;

for the optimization problem $P_1$, regarding the product of the analog and digital precoders as a whole and disregarding irrelevant constraints for the moment, obtaining a fully digital precoding problem $P_2$ by equation (2):

$$P_2: \underset{\{B[m]\}_{m=1}^M}{\text{maximize}} \; \frac{\sum_{k=1}^{K} R_k}{P^{total}} \qquad (2)$$

$$\text{s.t.} \; \sum_{k=1}^{K}\sum_{m=1}^{M} \|b_k[m]\|_2^2 \le P.$$

wherein B[m] denotes a hybrid precoding matrix, and $b_k[m] = V[m]w_k[m]$ denotes a precoding matrix for the kth user;
    considering statistical properties of wave propagation, using a tight bound $\bar{R}_k[m]$ of $R_k[m]$ as a replacement based on equation (3):

$$R_k[m] \le \bar{R}_k[m] \square \log\left(1 + \frac{\gamma_k|v_k^H[m]b_k[m]|^2}{\sum_{\ell \ne k}\gamma_k|v_k^H[m]b_\ell[m]|^2 + N_0}\right). \qquad (3)$$

wherein $R_k[m]$ denotes the rate of the kth user on the mth sub-carrier, $\gamma_k$ is channel energy between the satellite and the kth user, $v_k[m]$ denotes an array response vector at the mth sub-carrier with a frequency of $f_m$, and $N_0$ denotes the noise power;

letting $B^{(i)} = \{B^{(i)}[m]\}_{m=1}^{M}$ be a precoding matrix set of all the sub-carriers, and transforming the problem $P_2$ into a series of sub-problems $P_3^{(i)}$ by means of the Dinkelbach algorithm, wherein $i=1, 2, \ldots$, based equation (4):

$$P_3^{(i)}: \underset{B^{(i)}}{\text{maximize}} \ F(B^{(i)}, \eta^{(i)}) = \sum_{k=1}^{K} \overline{R}_k(B^{(i)}) - \eta^{(i)} P^{total}(B^{(i)}) \quad (4)$$

$$\text{s.t.} \ \sum_{k=1}^{K}\sum_{m=1}^{M} \|b_k^{(i)}[m]\|_2^2 \le P.$$

wherein $\overline{R}_k(B^{(i)})$ denotes the tight bound of a rate associated with the precoding matrix set of all the sub-carriers, $P^{total}(B^{(i)})$ denotes the total power associated with the precoding matrix set of all the sub-carriers, and the auxiliary variable $\eta^{(i)}$ meets the following equation (5):

$$\eta^{(i)} = \frac{\sum_{k=1}^{K} \overline{R}_k(B^{(i-1)})}{P^{total}(B^{(i-1)})}; \quad (5)$$

taking an ith sub-problem into consideration, and omitting the serial number i for convenience; letting $b_k[m]=b_{k,m}$ and $v_k[m]_{k,m}$, and then expressing the problem $P_3^{(i)}$ based equation (6):

$$P_3: \underset{B}{\text{maximize}} \ F(B) = \quad (6)$$

$$\sum_{k=1}^{K}\sum_{m=1}^{M} \log\left(1 + \frac{\gamma_k |v_{k,m}^H b_{k,m}|^2}{\sum_{\ell \ne k} \gamma_k |v_{k,m}^H b_{\ell,m}|^2 + N_0}\right) - \eta(\xi \|b_{k,m}\|_2^2 + P_t)$$

$$\text{s.t.} \ \sum_{k=1}^{K}\sum_{m=1}^{M} \|b_{k,m}\|_2^2 \le P.$$

wherein $1/\zeta$ is effectiveness of an amplifier, and $P_t$ is static power consumption;

by introducing an auxiliary variable $\lambda = \{\lambda_{k,m}\}_{k=1,m=1}^{K,M}$ and by means of Lagrangian dual transformation, transforming the problem $P_3$ into $P_4$ based on equation (7):

$$P_4: \underset{B,\lambda}{\text{maximize}} \ F(B, \lambda) = \sum_{k=1}^{K}\sum_{m=1}^{M} \log(1 + \lambda_{k,m}) + \quad (7)$$

$$(1 + \lambda_{k,m})\frac{\gamma_k |v_{k,m}^H b_{k,m}|^2}{\sum_{\ell \ne k} \gamma_k |v_{k,m}^H b_{\ell,m}|^2 + N_0} - \lambda_{k,m} - \eta(\xi\|b_{k,m}\|_2^2 + P_t)$$

$$\text{s.t.} \ \sum_{k=1}^{K}\sum_{m=1}^{M} \|b_{k,m}\|_2^2 \le P.$$

wherein $\lambda_{k,m}$ denotes an auxiliary variable; and
when B is fixed, $F(B, \lambda)$ is a concave function for the variable $\lambda_{k,m}$, and let $\partial F/\partial \lambda_{k,m}=0$, to obtain:

$$\lambda_{k,m}^{opt} = \frac{\gamma_k |v_{k,m}^H b_{k,m}|^2}{\sum_{\ell \ne k} \gamma_k |v_{k,m}^H b_{\ell,m}|^2 + N_0}. \quad (8)$$

wherein $\lambda_{k,m}^{opt}$ denotes an optimal value of the auxiliary variable;

by introducing the auxiliary variable $\rho = \{\rho_{k,m}\}_{k=1,m=1}^{K,M}$ and by means of quadratic transformation, transforming the problem $P_4$ into equations (9) and (10):

$$P_5: \underset{B,\lambda,\rho}{\text{maximize}} \ F(B, \lambda, \rho) \quad (9)$$

$$\text{s.t.} \ \sum_{k=1}^{K}\sum_{m=1}^{M} \|b_{k,m}\|_2^2 \le P.$$

wherein $\rho_{k,m}$ denotes the auxiliary variable; and $$F(B, \lambda, \rho) = \quad (10)$$

$$\sum_{k=1}^{K}\sum_{m=1}^{M} \log(1 + \lambda_{k,m}) - \lambda_{k,m} + 2\sqrt{(1 + \lambda_{k,m})\gamma_k} \ \Re\{b_{k,m}^H v_{k,m} \rho_{k,m}\} -$$

$$|\rho_{k,m}|^2\left(\sum_{\ell \ne k}^{K} \gamma_k |v_{k,m}^H b_{\ell,m}|^2 + N_0\right) - \eta(\xi\|b_{k,m}\|_2^2 + P_t).$$

wherein $\Re\{*\}$ denotes an operator for evaluation of a real part; and letting $\partial F/\partial \rho_{k,m}=0$, to obtain:

$$\rho = \frac{\sqrt{(1 + \lambda_{k,m})\gamma_k} \ v_{k,m}^H b_{k,m}}{\sum_{\ell=1}^{K} \gamma_k |v_{k,m}^H b_{\ell,m}|^2 + N_0}. \quad (11)$$

wherein $\rho_{k,m}^{opt}$ denotes an optimal value of the auxiliary variable;

when $(\eta, \lambda, \rho)$ is fixed, a target function of the problem $P_5$ being convex for the variable $b_{k,m}$, and then using the Lagrangian operator method for evaluation; and specifically, introducing the Lagrange multiplier t, and then expressing the Lagrange function of the problem $P_5$ based on equation (12):

$$L(\mathcal{B}, \lambda, \rho, t) = F(\mathcal{B}, \lambda, \rho) + t\left(\sum_{k=1}^{K}\sum_{m=1}^{M} \|b_{k,m}\|_2^2 - P\right). \quad (12)$$

wherein from KKT conditions, the following equations (13) and (14) are obtained:

$$b_{k,m}^{opt} = \left(\sum_{\ell=1}^{K} |\rho_{\ell,m}|^2 \gamma_\ell v_{\ell,m} v_{\ell,m}^H + (\eta\xi + t)I\right)^{-1} \sqrt{(1 + \lambda_{k,m})\gamma_k} \ \rho_{k,m} v_{k,m}, \quad (13)$$

$$t = \underset{t \ge 0}{\text{argmin}} \|b_{k,m}^{opt}\|_2^2 \le P. \quad (14)$$

wherein $b_{k,m}^{opt}$ denotes an optimal value of a precoding vector and I denotes a unit matrix;

for the mth sub-carrier, after an equivalent fully digital pre-coding matrix $B_{com}[m]$ is obtained, introducing a weighting coefficient $\zeta$ to weigh the performance of communication and sensing modules, wherein a corresponding minimization problem for a weighted sum is:

$$Q_1: \min_{V[m],W[m],U[m]} f(V[m], W[m], U[m]) = \quad (15)$$

$$\zeta\|V[m]W[m] - B_{com}[m]\|_F^2 + (1-\zeta)\|V[m]W[m] - U[m]\|_F^2$$

$$\text{s.t.} \quad V[m] \in S, \forall m,$$
$$\|B_{com}[m]\|_F^2 = \|V[m]W[m]\|_F^2,;$$
$$U[m]U^H[m] = I_P, \forall m;$$

and for any sub-carrier m, analog and digital precoding vectors are obtained by means of iterative solution, and the mark number m is omitted in the following description;

for the analog precoders using the fully connected structure:

(1) for the fixed V and W, transforming the problem $Q_1$ into:

$$Q_2: \min_{U} \|VW - B_{rad}U\|_F^2 \quad (16)$$
$$\text{s.t.} \quad UU^H = I_{P_r},$$

obtaining a solution to the problem $Q_2$ by means of singular value decomposition, namely:

$$U=QI_{P_r \times K}R, \quad (17)$$

wherein Q and R are results after singular value decomposition is performed for $B_{rad}^H VW$, that is, $Q\Sigma R = B_{rad}^H VW$, Q and R being unitary matrixes and $\Sigma$ being a diagonal matrix; and $I_{P \times K} = [I_{P_r}, 0]$ is a sparse matrix;

(2) for the fixed V and U, transforming the problem $Q_1$ into:

$$Q_3: \min_{W} \zeta\|VW - B_{com}\|_F^2 + (1-\zeta)\|VW - B_{rad}U\|_F^2 \quad (18)$$
$$\text{s.t.} \quad \|B_{com}\|_F^2 = \|AW\|_F^2,$$

wherein for the problem $Q_3$, its target function is expressed as a weighted sum of two F norms; and let the auxiliary matrixes $A=[\sqrt{\zeta}V^T, \sqrt{1-\zeta}V^T]^T \in C^{2N \times M'}$ and $C=[\sqrt{\zeta}B_{com}^T, \sqrt{1-\zeta}U^TB_{rad}^T]^T \in C^{2N \times K}$, to obtain $A^HA = V^HV$; and thus, the problem $Q_3$ is transformed into:

$$Q_4: \min_{W} \|AW - C\|_F^2 \quad (19)$$
$$\text{s.t.} \quad \|B_{com} = \|AW\|_F^2,$$

then, updating the digital precoder W based on equations (20) and (21):

$$W = (A^H A)^{-1} A^H C = (V^H V)^{-1} A^H C, \quad (20)$$

$$W = \frac{\|B_{com}\|_F}{\|VW\|_F} W. \quad (21)$$

(3) letting $G=[\sqrt{\zeta}W, \sqrt{1-\zeta}W] \in C^{M' \cdot 2K}$ and $T=[\sqrt{\zeta}B_{com}, \sqrt{1-\zeta}B_{rad}U] \in C^{N \times 2K}$ be auxiliary matrixes, and for the fixed W and U, transforming the problem $Q_1$ into:

$$Q_5: \min_{W} \|VG - T\|_F^2 \quad (22)$$
$$\text{s.t.} \quad V \in S_{FC},$$

letting the auxiliary matrix $Y=GG^H$, wherein its maximum characteristic value is $\lambda_{max}(Y)$; and then transforming the problem $Q_5$ into:

$$V = \exp\{-\phi \angle Z^T\}, \quad (23)$$

wherein $\phi = \sqrt{-1}$, $Z = GT^H - (Y - \lambda_{max}(Y)I_{M_t})V^H$ is an auxiliary matrix, and $\angle$ denotes an operator for evaluation of an angle; and repeating steps (1) to (3) till the target function/converges; for the analog precoder having the partially connected structure, the (i,j)th element thereof being $[V]_{i,j} = \exp\{\phi \phi_{i,j}\}$, and $\forall i, j = \lceil i/N_g \rceil$, wherein $\lceil * \rceil$ denotes an operator for evaluation of an upper bound; $\phi_{i,j}$ being an angle of the (i,j)th element in the matrix, and $N_g = N_t/M_t$; and a corresponding analog precoding matrix meeting $$\|VW\|_F^2 = N_g\|W\|_F^2 = \|B_{com}\|_F^2;$$

(a) for the fixed V and W, transforming the problem $Q_1$ into:

$$Q_6: \min_{U} \|VW - B_{rad}U\|_F^2 \quad (24)$$
$$\text{s.t.} \quad UU^H = I_{P_r},$$

obtaining a solution to the problem $Q_6$ by means of singular value decomposition, namely:

$$U=QI_{P_r \times K}R, \quad (25)$$

wherein Q and R are results after singular value decomposition is performed for $B_{mod}^H VW$, that is, $Q\Sigma R = B_{mod}^H VW$, Q and R being unitary matrixes and $\Sigma$ being a diagonal matrix; and $I_{P \times K} = [I_{P_r}, 0]$ is a sparse matrix;

(b) letting Let $A=[\sqrt{\zeta}V^T, \sqrt{1-\zeta}V^T]^T \in C^{2N \times M'}$ and $C=[\sqrt{\zeta}B_{com}^T, \sqrt{1-\zeta}U^TB_{rad}^T]^T \in C^{2N \times K}$ be auxiliary matrixes, and for the fixed V and U, transforming the problem $Q_1$ into:

$$Q_7: \min_{W} \|A^H C - W\|_F^2 \quad (26)$$
$$\text{s.t.} \quad \|W\|_F = \frac{\|B_{com}\|_F}{\sqrt{N_g}},$$

and then, updating the digital precoder W as follows:

$$W = \frac{\|B_{com}\|_F}{\sqrt{N_g}} \frac{A^H C}{\|A^H C\|_F}. \quad (27)$$

(c) letting the auxiliary matrixes $a=[\sqrt{\zeta}[B_{com}]_{i,:}, \sqrt{1-\zeta}[B_{rad}U]_{i,:}]$ and $p=[\sqrt{\zeta}[W]_{j,:}, \sqrt{1-\zeta}[W]_{j,:}]$, wherein $[*]_{i,:}$ denotes the ith row of the matrix and $[*]_{j,:}$ denotes the jth row of the matrix; and for the fixed W and U, transforming the problem $Q_1$ into:

$$Q_8: \underset{V}{\text{minimize}} \; \|a - \exp\{\varnothing \phi_{i,j}\} p\|_2^2 \quad (28)$$

$$\text{s.t.} \; V \in S_{PC},$$

then, expressing a solution to the problem $Q_8$ as follows:

$$[V]_{i,j} = \exp\{\varnothing L(ap^H)\}, \; \forall \, i, \; \forall \, j = \left\lceil \frac{i}{N_g} \right\rceil; \quad (29)$$

repeating steps (a) to (c) till the target function f converges.

* * * * *